Nov. 17, 1925.
W. BERK
1,562,407
LAMP BRACKET
Filed July 6, 1925
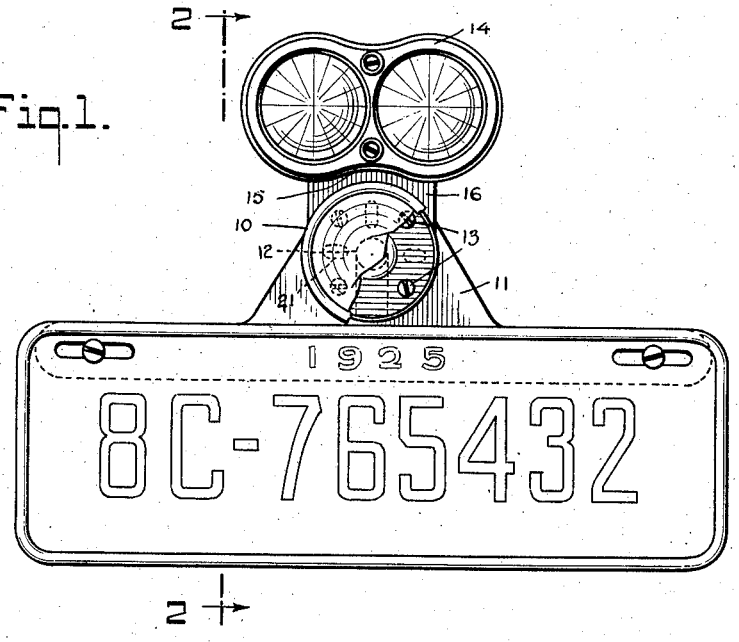
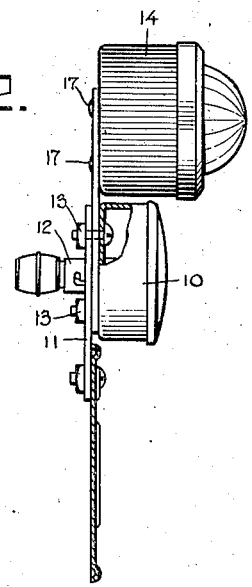
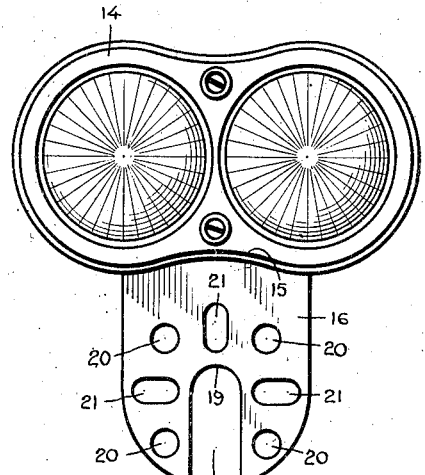
INVENTOR
William Berk
BY
William S. Glick
ATTORNEY Patented Nov. 17, 1925.

1,562,407

UNITED STATES PATENT OFFICE.

WILLIAM BERK, OF NEW YORK, N. Y., ASSIGNOR TO AMERICAN AUTO LAMP CO., INC., OF NEW YORK, N. Y., A CORPORATION OF NEW YORK.

LAMP BRACKET.

Application filed July 6, 1925. Serial No. 41,554.

*To all whom it may concern:*

Be it known that I, WILLIAM BERK, a citizen of the United States, and a resident of the city of New York, county of Bronx, and State of New York, and whose post-office address is 1072 Bryant Avenue, New York, N. Y., have invented certain new and useful Improvements in a Lamp Bracket, of which the following is a specification.

My invention relates to automobile lamps and has particular reference to a supporting bracket for an auxiliary lamp casing support and its manner of association with an already existing lamp supporting arrangement.

Automobiles are in general equipped with tail lamps and it has become customary and almost essential of late to equip an automobile with additional signal devices in the nature of lamps or the like for indicating intended retardation of speed or prospective change of direction. The installation of such signal devices usually entails considerable amount of extra labor and expense in the nature of suitably preparing a portion of the frame work of the automobile for attachment thereto of such a device and providing the latter with suitable attaching means. In many cases it has been found advisable or necessary to remove the original tail lamp entirely and replace it with a device of a character which embodies not only the additional signal devices, but also a lamp unit designed to function in the same manner as the tail lamp and with which automobiles are generally provided as standard equipment. A procedure of the latter class necessitates a further expenditure of time, labor, and skill in disconnecting the original tail lamp wiring and subsequently rewiring the newly installed device.

It is an object of my invention to provide an auxiliary signal device which may be mounted and installed upon an automobile in a manner requiring no special labor, extra connecting parts, or skill.

According to a feature of the invention, an auxiliary signal device of this character is provided with a supporting bracket adapted to be interposed between any two elements of the automobile which are removably attached to each other by fastening means, so that these fastening means also secure the auxiliary signal device in position and more specifically to an arrangement in which the bracket is provided with a plurality of openings to receive these same original fastening means for purposes of attachment.

Another object of the invention is to provide this bracket in the form of an element which is of exceptionally simple construction and correspondingly inexpensive to manufacture.

In a preferred embodiment, an auxiliary device embodying such a bracket is designed to be installed in close proximity and association with the ordinary tail lamp. Accordingly the bracket is designed in a manner making it suitable to utilize the ordinary tail lamp and its support as the selected two elements which are removably attached by fastening means, whereby a substantially single unit is produced embodying a tail lamp and auxiliary signalling devices wherein no special or extra fastening means have been utilized and no disconnection and rewiring of the original tail lamp has been necessitated.

In a preferred embodiment, I provide the auxiliary device in the form of a lamp casing adapted to receive any desired number of lamps in any preferred relative position, and having a portion so shaped as to conform substantially with a portion of the periphery of the tail lamp.

According to another feature of the invention, the bracket is provided with an anchoring slot adapted to receive a portion of either of the two removably attached elements projecting through the other thereof, and in a preferred embodiment, to receive the stem of the tail lamp which projects through an opening in the tail lamp support in a well-known manner.

Another feature of the invention lies in providing the bracket with a plurality of symmetrically spaced openings so positioned and designed as to permit alignment of certain of them with the fastening means of a large variety of tail lamp constructions.

In a preferred embodiment, the bracket comprises a flat plate provided with an open-end anchoring slot having a semi-circular inner end and provided with a plurality of alternate circular and elliptical or elongated openings disposed about the slot in a manner to provide four circular openings at the corners of a square whose center coincides with that of the semi-circular inner end of the slot.

For the attainment of these objects and such other objects as may appear or be pointed out, I have illustrated embodiments of my invention wherein:—

Fig. 1 is a front elevation of a preferred construction of my device in assembled position relative to a tail lamp;

Fig. 2 is a side view of the same, with parts shown in section along the line 2—2 of Fig. 1; and Fig. 3 is a front elevation of my complete device taken by itself.

Referring to the drawings, and particularly to Figs. 1 and 2, I have shown a tail lamp 10 mounted upon a support or panel 11 in a well-known manner whereby the wire-carrying stem 12 of the tail lamp projects through an opening in the support 11, and a plurality of fastening means such as bolts and nuts 13 removably attach the lamp 10 to its support. In the illustrated embodiment the fastening means 13 are arranged at the corners of a square, showing by way of example one of numerous standard tail lamp constructions.

In Fig. 3, I have shown a construction embodying the various features of my device comprising a lamp casing 14 designed to receive two adjacent lamps and shaped, in the embodiment, in a substantially elliptical form having a depressed or concave portion 15 designed to conform substantially with a portion of the periphery of a tail lamp in association with which the device is to be installed. A supporting bracket 16 is carried by the casing 14 and comprises a substantially flat plate in any preferred or desired manner as by rivets 17 attached to the rear wall of the casing 14 to provide a depending extension thereof. At its extremity the plate 16 is provided with an open-end anchoring slot 18 having a semi-circular inner end 19 preferably disposed about midway of the plate 16. About the slot 18 are arranged a plurality of alternate circular and elliptical openings of which four circular ones 20 are disposed at the corners of a square whose center coincides with the center of the semi-circle 19, and of which radially elongated openings 21 are disposed in the intervals between the openings 20. When installed in connection with the tail lamp 10, the slot 18 receives the stem 12 of the lamp 10, and the openings 20 align with the fastening means 13.

The method of attaching and installing the device is extremely simple and merely requires the temporary removal of the fastening means 13 whereby the plate 16 may be inserted into the space between the lamp 10 and its support 11. The slot 18 will allow passage thereinto of the stem 12 to anchor the device in position, and certain of the openings about the slot 18 will have aligned with the openings in the lamp and its support through which the fastening means 13 are to be reinserted. In the embodiment illustrated, the openings 21 are entirely inoperative by virtue of the disposition of the fastening means 13; but it will be obvious that other well-known tail lamp constructions might necessitate the utilization of other sets of openings or groups thereof, as required. By merely retightening the fastening means 13, the device will have been completely installed and firmly held in position to constitute with the tail lamp a substantial unit of a type which heretofore has necessitated many extra parts, skilled labor and expense. The wiring of the lamp 10, which passes through the stem 12, will have been left intact, and the electrical connection between the auxiliary lamps and the dashboard, footbrake, or the like, may be made with great facility without interfering in any way with the electric wiring already installed.

As a result of my invention, there is therefore produced an installed device which has entailed a minimum first cost, a complete absence of special attaching parts and the expenditure of the least amount of time, skill, and labor. Furthermore, by my arrangement, I am enabled to associate additional signalling devices with those already in position so as to give the associated devices the appearance of a unitary structure.

It will be obvious that various changes in the details herein described and illustrated for the purpose of explaining the nature of my invention may be made by those skilled in the art within the principle and scope of my invention as set forth in the following claim.

Having thus described my invention and illustrated its use, what I claim as new and desire to secure by Letters Patent is:—

A signalling lamp adapted to be associated with another signalling lamp already attached to a vehicle, said first named lamp having attaching means comprising a depending plate, said plate having radially disposed enlarged bolt receiving openings and a lamp socket opening extending to the edge of the plate whereby the lamp may be attached without removal of the second named lamp from the vehicle.

In witness whereof, I have signed this specification this 30th day of June, 1925.

WILLIAM BERK.